Sept. 8, 1931. W. BARBER 1,822,556
CUSHION TIRE
Filed Aug. 9, 1927 2 Sheets-Sheet 1
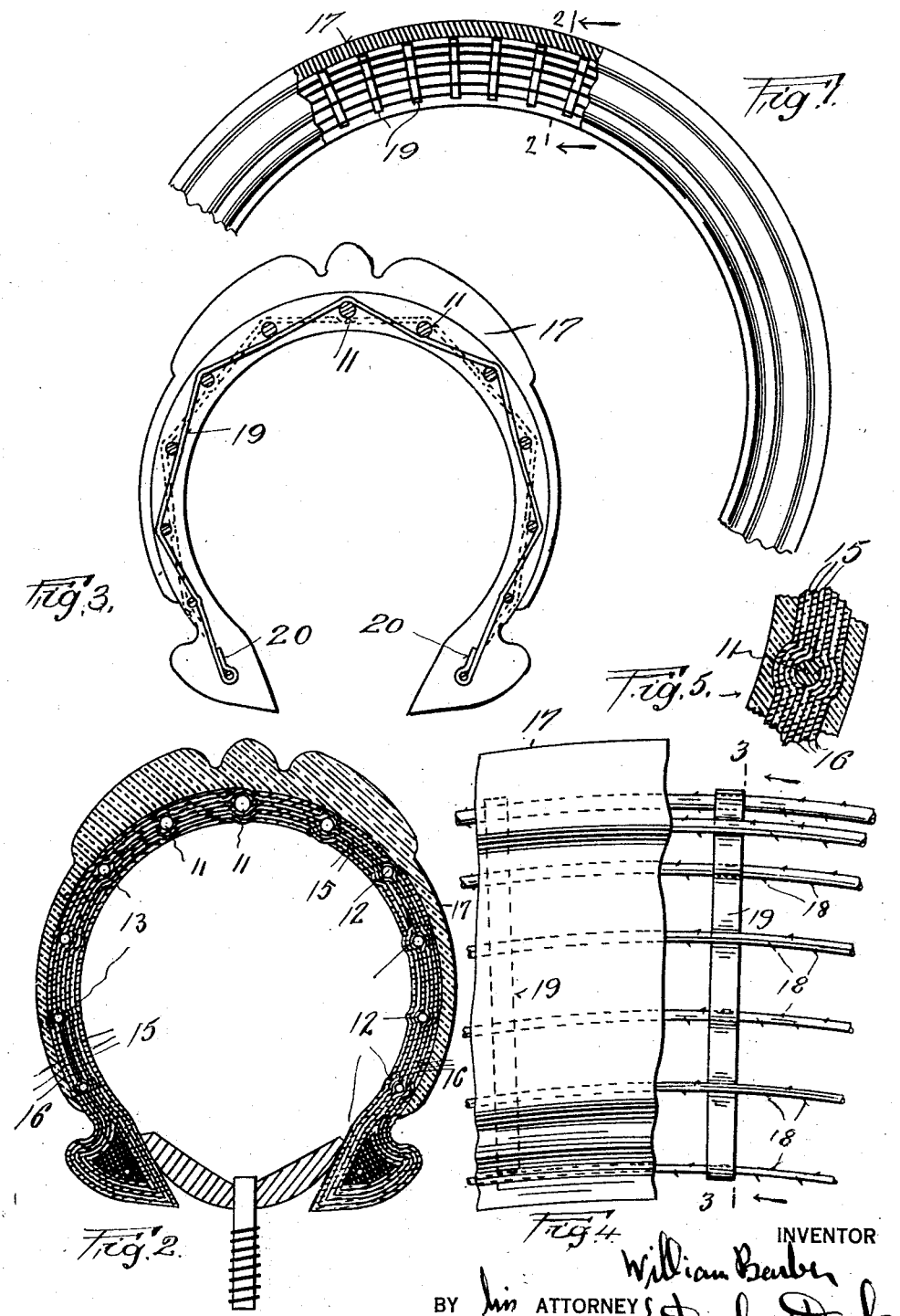

Sept. 8, 1931.     W. BARBER     1,822,556
CUSHION TIRE
Filed Aug. 9, 1927     2 Sheets-Sheet 2
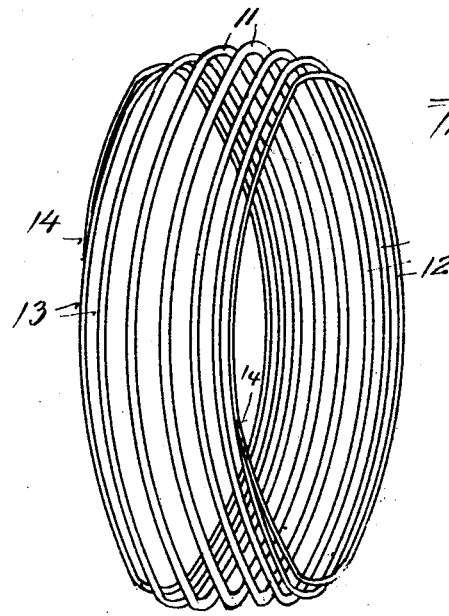
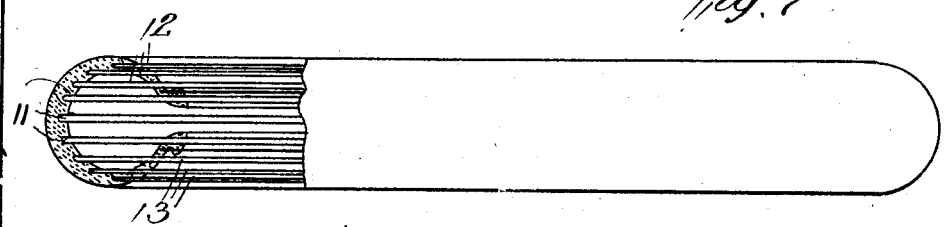

Patented Sept. 8, 1931

1,822,556

UNITED STATES PATENT OFFICE

WILLIAM BARBER, OF BROOKLYN, NEW YORK

CUSHION TIRE

Application filed August 9, 1927. Serial No. 211,836.

This invention relates to cushion tires.

The object of the invention is to provide a cushion tire structure which is simple, economical to manufacture, and efficient in use, and wherein the usual inner pneumatic or air-inflated tube is dispensed with.

A further object is to provide a simple structure of cushion tire without employing an air inflated inner tube, and wherein its own inherent resiliency enables it to receive and resist the deforming effects of load and shocks when in service.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings:

Fig. 1 is a view in side elevation of a portion of a tire embodying my invention, parts broken away, and in longitudinal section, to more clearly illustrate the manner of constructing the same.

Fig. 2 is a view in transverse section on the line 2, 2, Fig. 1, looking in the direction of the arrows, of a completed tire embodying my invention.

Fig. 3 is a view in transverse section on the line 3, 3, Fig. 4, looking in the direction of the arrows.

Fig. 4 is a view in side elevation, somewhat diagrammatic, illustrating the manner of constructing a tire embodying my invention.

Fig. 5 is a fragmentary detail in transverse section.

Fig. 6 is a view in perspective showing the spring cage or frame employed in constructing a tire according to my invention.

Fig. 7 is a plan view partly in section of said tire.

Fig. 8 is a broken view showing a portion of wire or wire rod suitable for use in constructing the cage or frame shown in Fig. 5.

The same part is designated by the same reference numeral wherever it occurs throughout the several views.

The pneumatic or air inflated inner tube tires now used almost universally on automobiles, and other vehicles, constitute a source of constant annoyance and expense by reason of deflation of the inner tube through a leaking valve, or a puncture, or a blow-out, which often occurs, and by reason of the wear on the outer shoe due to its collapse when the inner tube becomes deflated. Notwithstanding these serious disadvantages and constantly occurring annoyances, and the initial, as well as maintenance and upkeep expense, incurred, such air inflated inner tube tires are still in almost universal use because no other type of tire structure has yet appeared on the market which secures as satisfactory a cushioning effect as does such an inflated tire.

It is among the purposes of the present invention to provide a tire structure which secures the desired cushioning effect and resiliency enabling it to take and effectively resist the collapsing or deforming effects of load and shocks imposed thereon in use and without employing an air inflated inner tube. In carrying out my invention in the practical embodiment thereof, I propose to provide a tire structure having an inherent resiliency capable of providing the desired cushioning effect and of resisting the deflating and deforming action of loads and shocks in service. To this end I propose to employ a spring frame structure which I incorporate or build into the structure of the shoe in which it is so disposed and braced as to impart reasonable resiliency to the shoe under loads and shock and to yieldingly resist the pressures of the load and the deflating action of shocks and jars. According to one form of embodiment of my invention I construct the spring frame in the form of a double helical coil out of a spring rod or wire of the desired size and thickness, said frame spring being formed into a shape corresponding in transverse dimension to the transverse sectional contour of the shoe. I then build up the shoe structure on this frame in the usual manner of constructing tire shoes, thereby imbedding the spring frame into the body of the shoe and imparting thereto the desired qualities of resiliency.

In practice I prefer to employ a rod or wire which tapers in size or diameter from its central or midlength region towards each end so that when the double helical frame is completed the portion of the rod or wire which is of the largest diameter or size will form the coils of the helix which lie closest to the tread portion of the tire.

I also propose to provide means to brace apart the several coils of the helices into which the wire or rod is formed so as to hold and maintain them in the desired spatial relation, and enable them to maintain the uniform contour and cross sectional shape of the shoe.

In Figs. 7 and 8 I have shown portions of a tapering rod or wire 10, suitable for use in carrying out my invention. This wire or rod is formed into coils of a diameter corresponding approximately with the diameter of the shoe, the several coils being laterally displaced with respect to each other, and of decreasing diameters from the centrally disposed coils towards the respectively opposite sides of the frame. Thus, referring to Figs. 6 and 7 the central coils 11, are of the largest diameters, and, if a tapering wire or rod is used, these centrally disposed coils are formed of that portion of the wire or rod which is the largest in size. These central coils 11 are designed to occupy the central or tread zone portion of the tire. The coils 12, 13, at the respectively opposite sides of the central coils are formed of respectively decreasing diameters and are disposed to follow the general contour of the sides of the shoe. Thus the spring frame consists of a double helical coil. The two ends or extremities of the wire or rod are suitably welded or otherwise secured to the outermost and hence the smallest, coil, at the respectively opposite sides of the frame, as indicated at 14.

The spring frame, constructed as above described, may then be imbedded in the tire structure. This can be accomplished in various ways. One simple way is to apply the usual fabric layers, ordinarily incorporated into tire or shoe structures, to the spring frame in such manner that the said frame will be covered on the outer and inner sides thereof, and both longitudinally and transversely with successively applied layers of suitable fabric. In Fig. 2 I have indicated at 15 the inner layers, and at 16 the outer layers of fabric material. Any desired number of such fabric layers may be employed. In practice I prefer to coat the fabric layers with an adhesive and vulcanizable liquid composition. After the application of the fabric layers, the rubber material to from the outer and tread portions 17 is applied and the entire built up structure is then subjected to heat and pressure in the usual manner to effect vulcanization, and the shoe is then ready for use. In the operation described the spring frame becomes imbedded and anchored in the tire or shoe structure, and serves to impart to such structure the desired resilience to secure the cushioning effect, and to enable the same to yieldingly resist the deflating and deforming action of loads or shocks imposed thereon when in use.

If desired, and in order to prevent any relative movement of the fabric portion of the shoe and the coils of the spring frame, the wire or rod 10 may be formed or provided with tips or barbs, indicated at 18, Fig. 4, at various points which penetrate the fabric layers and serve as anchorages therefor.

In some cases it may be desirable to provide means to prevent lateral displacement of the coils of the frame, and to maintain said coils in fixed spatial relation to each other. To accomplish this I have shown the coils forming the spring frame as being engaged by brace or spacing straps 19, which are disposed transversely of said coils and interwoven successively over and under the respective coils of the spring frame. The ends of the transverse straps are secured around the wire or rod of the outermost coils, as indicated at 20, Fig. 3. The successive transverse binder straps 19 are interwoven in respectively alternate relation with the coil wires or rods of the frame, as indicated in full and dotted lines in Fig. 3. The spatial relation of adjacent straps may be varied according to the load the shoe is to carry. Likewise the size of the wire or rod 10, and the number of coils thereof composing the double helical frame, will be dependent upon the load which the shoe is to carry when in use. Obviously when the helical coil, such as is illustrated in Fig. 6 for example has been reinforced by the spacing straps as described above, the structure may be inserted in a shoe to replace the usual pneumatic tube, or the coil may be used unreinforced.

A shoe of any type or style, and adapted to any form or type of wheel rim or felly may be constructed according to my invention. I therefore do not desire to be restricted to the shape or type of tire shoe, nor to any particular means to secure the same onto a felly or rim.

A structure such as above described is easily built up by forming the double helical coil spring frame upon a suitable block or former and applying the fabric layers and rubber when these are used and vulcanizing the entire structure in the usual ordinary and well known manner as carried out in present every day practice, the transverse binder straps, if used, being built into the coil frame before the application thereto of the fabric layers.

Having now set forth the objects and nature of my invention and a construction embodying the principles thereof, what I claim as new and useful, and of my own invention is,—

1. In a cushion tire structure, a spring element of varying diameter formed into helical coils following the longitudinal and transverse contour of the shoe and imbedded in the body thereof to encircle said shoe body.

2. In a tire structure, a resilient element tapered from its midlength region toward its ends and formed into coils conforming to the longitudinal and transverse contour of the shoe, and imbedded in the body thereof.

3. In a cushion tire structure, a double helical spring coil made from a resilient spring element of varying diameter to form a spring frame, said frame being imbedded on the inner surface and within the body of the tire.

4. In a cushion tire structure, a double helical spring coil formed from a resilient spring element of varying diameter having fabric layers and rubber applied thereto, the diameter of said helical spring element varying with the diameter of the helical coil.

5. In a cushion tire structure, a helical spring coil frame made from a resilient spring element of varying diameter and having the convolutions thereof of increasing diameter from the sides towards the central portion of the frame, said frame being imbedded within the body of the tire to support the same from within.

6. In a cushion tire structure, a tire body, a frame supporting the body of the tire consisting of a continuous spring element of varying diameter having its greatest diameter mediate its ends, said element formed into a double helix having coils which are embedded in the tire.

7. In a tire structure, a tire body, a spring frame supporting the body of the tire comprising an element tapering towards both of its ends from its midlength point and formed into a double helix, the diameter of the coils of which vary with the distance thereof from the medial line of the double helix.

8. In a cushion tire structure, a tire body, a double helical spring coil embedded in said body formed from a resilient spring element tapering from its midlength point towards either end thereof and having the coil convolutions thereof of increasing diameter from the sides towards the central portion.

9. In a cushion tire structure, a tire body, a frame comprising a double helical spring coil embedded in said body formed from a resilient spring element tapering from its midlength point towards either end thereof and having the coil convolutions thereof of increasing diameter from the sides towards the central portion, and transversely disposed bracing and spacing strips for the coil convolutions, said frame embedded within the body of the tire.

10. In a cushion tire structure, a tire body, a frame comprising a double helical spring coil embedded in said body formed from a resilient spring element tapering from its midlength point towards either end thereof and having the coil convolutions thereof of increasing diameter from the sides towards the central portion, transversely disposed bracing and spacing strips for the coil convolutions, said frame being embedded within the body of the tire, and means for anchoring said coil convolutions in the tire body.

11. In a cushion tire structure, a tire body, a double helical spring coil embedded in said body formed from a resilient spring element having anchoring barbs and tapering from its midlength point towards either end thereof, and having the coil convolutions thereof of increasing diameter from the sides towards the central portion.

12. In a cushion tire structure, a tire body and a supporting frame therefor, said frame comprising a single spring element embedded in the body and formed into a plurality of coils of relatively decreasing diameters from the medial line of the body, said spring element being tapered from its midlength point towards the ends thereof.

13. In a cushion tire structure, a tire body and a supporting frame therefor, said frame comprising a single spring element embedded in the body and formed into a plurality of coils of relatively decreasing diameters from the medial line of the body, said spring element being tapered from its midlength point towards the ends thereof, and anchoring barbs for securing said spring element to the body in which the same is embedded.

14. In a cushion tire structure, a helical spring coil frame made from a resilient spring element of varying diameter and having convolutions thereof of increasing diameter from the sides towards the central portion of the frame at which portion the spring element has its maximum diameter, said convolutions being spaced and held laterally apart from each other, said frame being embedded within the body of the tire.

In testimony whereof I have hereunto set my hand on this fourth day of August, A. D. 1927.

WILLIAM BARBER.